United States Patent
Kjeldergaard et al.

(10) Patent No.: US 9,710,882 B2
(45) Date of Patent: Jul. 18, 2017

(54) DATA OVERLAY FOR ANIMATED MAP WEATHER DISPLAY AND METHOD OF RAPIDLY LOADING ANIMATED RASTER DATA

(71) Applicant: ITERIS, INC., Santa Ana, CA (US)

(72) Inventors: Eric Dean Kjeldergaard, Grand Forks, ND (US); Leif Pedersen, Grand Forks, ND (US)

(73) Assignee: ITERIS INC., Santa Ana, CA (US)

( * ) Notice: Subject to any disclaimer, the term of this patent is extended or adjusted under 35 U.S.C. 154(b) by 230 days.

(21) Appl. No.: 14/315,217

(22) Filed: Jun. 25, 2014

(65) Prior Publication Data

US 2014/0375678 A1    Dec. 25, 2014

Related U.S. Application Data

(60) Provisional application No. 61/839,069, filed on Jun. 25, 2013.

(51) Int. Cl.
| | |
|---|---|
| *G09B 29/00* | (2006.01) |
| *G06T 3/40* | (2006.01) |
| *G06T 17/05* | (2011.01) |
| *H04W 4/00* | (2009.01) |
| *G01C 21/36* | (2006.01) |
| *G09G 5/14* | (2006.01) |

(52) U.S. Cl.
CPC .............. *G06T 3/40* (2013.01); *G01C 21/367* (2013.01); *G06T 17/05* (2013.01); *G09B 29/003* (2013.01); *G09G 5/14* (2013.01); *H04W 4/00* (2013.01); *G01C 21/3691* (2013.01); *G06T 2210/08* (2013.01); *G06T 2210/36* (2013.01); *G09G 2340/04* (2013.01); *G09G 2340/045* (2013.01); *G09G 2340/12* (2013.01); *G09G 2350/00* (2013.01)

(58) Field of Classification Search
CPC . G09B 29/003; G09B 29/006; G09G 2340/12
See application file for complete search history.

(56) References Cited

U.S. PATENT DOCUMENTS

| | | | | |
|---|---|---|---|---|
| 2010/0321399 | A1* | 12/2010 | Ellren | ............... G06F 17/30241 345/587 |
| 2013/0103648 | A1* | 4/2013 | Sample | ................ G09B 29/003 707/661 |
| 2013/0339891 | A1* | 12/2013 | Blumenberg | .......... G01C 21/26 715/771 |

\* cited by examiner

Primary Examiner — Matthew Salvucci
(74) Attorney, Agent, or Firm — Lazaris IP (57) ABSTRACT

A data visualization technique rapidly loads images to decrease data transfer time and associated bandwidth cost for animation effects in displays of data, and includes initially loading raster imagery at a coarser zoom level than a current view on the display, and then manipulating the imagery using general-purpose image manipulation algorithms to interpolate data points as a user adjusts the zoom level. In this manner, the data visualization technique intentionally displays a coarser view than that selected, rather than transferring entirely new imagery or datasets, and manipulates the imagery as necessary to avoid loading more data from a remote server to the local client each time the user adjusts the view.

24 Claims, 3 Drawing Sheets

DATA OVERLAY FOR ANIMATED MAP WEATHER DISPLAY AND METHOD OF RAPIDLY LOADING ANIMATED RASTER DATA

CROSS-REFERENCE TO RELATED PATENT APPLICATIONS

This patent application claims priority to U.S. provisional application 61/839,069, filed on Jun. 25, 2013,the contents of which are incorporated in their entirety herein.

FIELD OF THE INVENTION

The present invention relates to a method of data transfer for an animated display of raster imagery. Specifically, the present invention relates to transfer and display of information such as weather data as an animated overlay on a base map that allows for significant savings in bandwidth cost and time by performing pixel and image size calculations at a local client, so that images of a certain resolution do not need to be loaded each and every time a different view of the image is requested at the local client.

BACKGROUND OF THE INVENTION

There are many existing methods of displaying information on an animated map. In animated map technology, a "slippymap" is a tile-based map that permits a user to perform pan and zoom display controls. The user interface that controls a slippymap is known as a slippymap frame, in which data may be displayed in one or more rasterized layers, which are layers that overlay raster imagery onto the slippymap. Each raster layer is a grid of pixels that adds content to the map, such as precipitation and other weather patterns, or traffic capacity or speed. A slippymap may also include a base layer, which is the first map layer loaded into the slippymap frame. This base layer is not transparent, whereas other layers have partly or fully transparent parts so that the base layer shows through. The base layer may also be a raster layer. Other data may be present in one or more vector layers, which are layers that represent data with discretely-described objects rather than a grid of pixels.

Raster layers are not interactive, but vector layers may be, since client-side code draws and understands vector layers. Animated raster layers are layers of raster imagery where the pixel data is replaced on a timer to animate content. This may display changing conditions over time, such as for air temperature, pavement conditions, or traffic speeds. Vector layers may also be animated.

In existing technology, when users wish to zoom in or zoom out on an animated map, old images are discarded and new ones are loaded each and every time the user activates a zoom in or zoom out command. Each such command request loads a new image that has the same resolution as the client's screen's view of the map. The state of the prior art therefore involves simply loading data tiles from the server for every time-slice selected, resulting in long data transfer times since an animated raster overlay is many times larger than a static raster overlay—and like a static raster overlay, it has to be reloaded every time the user changes the zoom level.

Existing systems and methods that attempt to reduce the volume of data downloaded include techniques such as limited animation, which is a type of flash animation which reuses common parts between frames. In this type of animation, an image is created with fewer attributes to create the same effect so that the overall number of images is reduced, resulting in a lower cost. However, these techniques do not lend itself well to accuracy in the display of raster imagery such as weather data in slippymap technology, since the image selected for zooming in or out must still be separately downloaded when selected.

These existing methods of displaying animated data when a user zooms in or out are therefore cumbersome due to lengthy download times resulting from high bandwidth consumption, and they are costly to implement for the same reason.

BRIEF SUMMARY OF THE INVENTION

It is therefore one objective of the present invention to provide a system and method of presenting raster imagery in an overlay that displays changes in information such as weather data over time. This is accomplished by displaying such weather data in an animated raster layer, such as for example describing forecasted air temperature as it changes over time. Because such layers have an acceptable appearance if they are stretched or squished, once the client has loaded a tile of data representing a smaller slice of a larger image, it will be manipulated (by stretching or "squishing" it as necessary) when the user zooms in and out to reduce the amount of data transferred. In the present invention, this raster data is initially loaded for a coarser zoom level than the current view, and is then manipulated as necessary as the client would do if the user had started at the coarser view and zoomed in. In this manner, the present invention intentionally loads a seemingly incorrect resolution, resulting in reduced transfer times. Further, when the user zooms in or out, the client application or browser manipulates the coarser view rather than reloading the data from scratch at a new resolution. Using this approach, and in a further objective, the present invention reduces the load time and data transfer requirements of raster imagery for animation by as much as 90% while still maintaining acceptable image quality. This improves the user experience by sacrificing unnecessary precision in exchange for reducing load times from minutes to seconds, and in the process, realizes significant savings in bandwidth costs.

Other embodiments, features and advantages of the present invention will become apparent from the following description of the embodiments, which illustrate, by way of example, the principles of the invention.

BRIEF DESCRIPTION OF THE SEVERAL VIEWS OF THE DRAWINGS

The accompanying drawings, which are incorporated in and constitute a part of this specification, illustrate several embodiments of the invention and together with the description, serve to explain the principles of the invention.

DETAILED DESCRIPTION OF THE INVENTION

In the following description of the present invention reference is made to the accompanying figures which form a part thereof, and in which is shown, by way of illustration, exemplary embodiments illustrating the principles of the present invention and how it is practiced. Other embodiments will be utilized to practice the present invention and structural and functional changes will be made thereto without departing from the scope of the present invention.

The present invention provides a data visualization technique 100, which represents a system and method of displaying data 120 in an animated map 110 such as a "slippymap" which significantly improves data transfer time and reduces costs from bandwidth usage. The present invention provides a quick-loading method of presenting animated raster imagery 130 on such a map 110, independent from and overlaid on top of a base layer 140. In a slippymap implementation, these raster overlays 130 are displayed as tiles 150 that are transparent, or partly or semi-transparent, so that users can easily see the underlying base layer 140 through the overlay 130.

Figure 1:
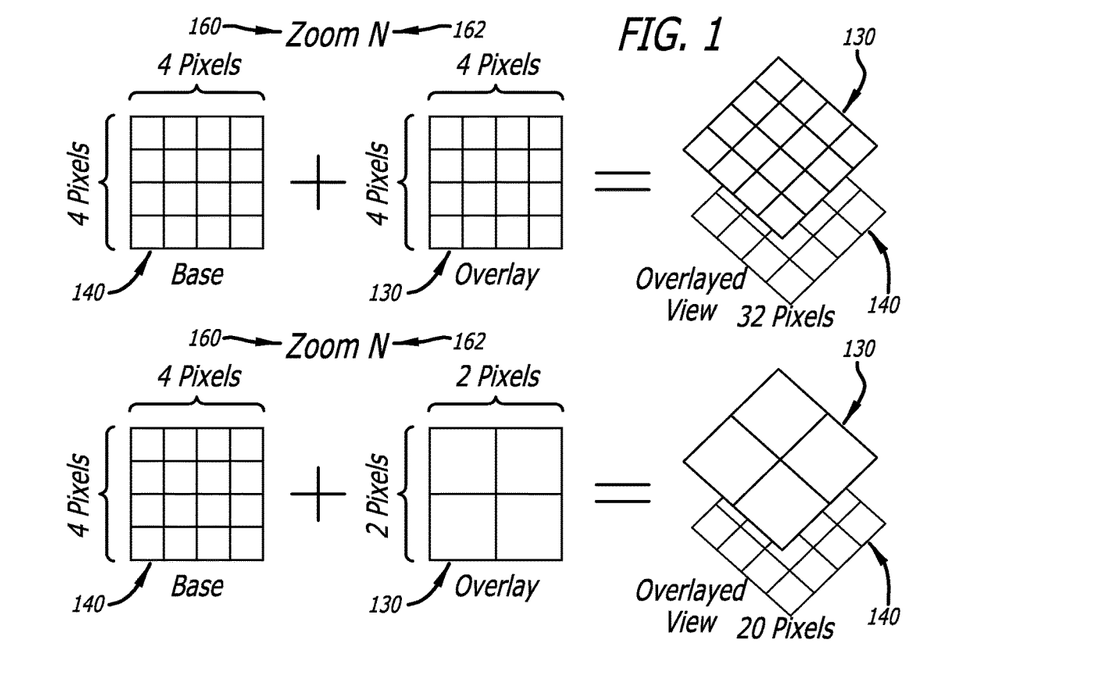
FIG. 1 is a conceptual diagram showing a base layer and an overlay at a zoom level n of a data visualization technique according to the present invention.

FIG. 1 is a conceptual diagram of the data visualization technique 100, showing both a prior art implementation, as well as an exemplary combination of a base layer 140 and an overlay of raster imagery 130. FIG. 1 represents an exemplary display of data 120 at an initial user-selected zoom level 160, for example zoom level n 162, in comparison to a known method of simply loading data tiles from the server for every time-slice selected. In the example of FIG. 1, the base layer 140 is comprised of a tiled view of a map 110 comprised of, for example, 4×4 pixels. At the user-selected zoom level n 162, a tile 150 of data 120 is downloaded for the overlay 130 at a pixel size of 2×2. Accordingly, the overlay 130 showing data 120 is 16+4=20 square pixels.

FIG. 1 also shows a prior art implementation, where the base layer 140 is comprised of a tiled view of a map 110 comprised of, for example, 4×4 pixels. At the user-selected zoom level n 162, a tile 150 of data 120 is downloaded for the overlay 130 at the same pixel size of 4×4. Therefore, in such a prior art implementation, the overlay 130 showing data 120 is 16+16=32 square pixels. This results in long data transfer times, since an animated raster overlay is many times larger than a static raster overlay, and has to be reloaded every time the user changes the zoom level.

Figure 2:
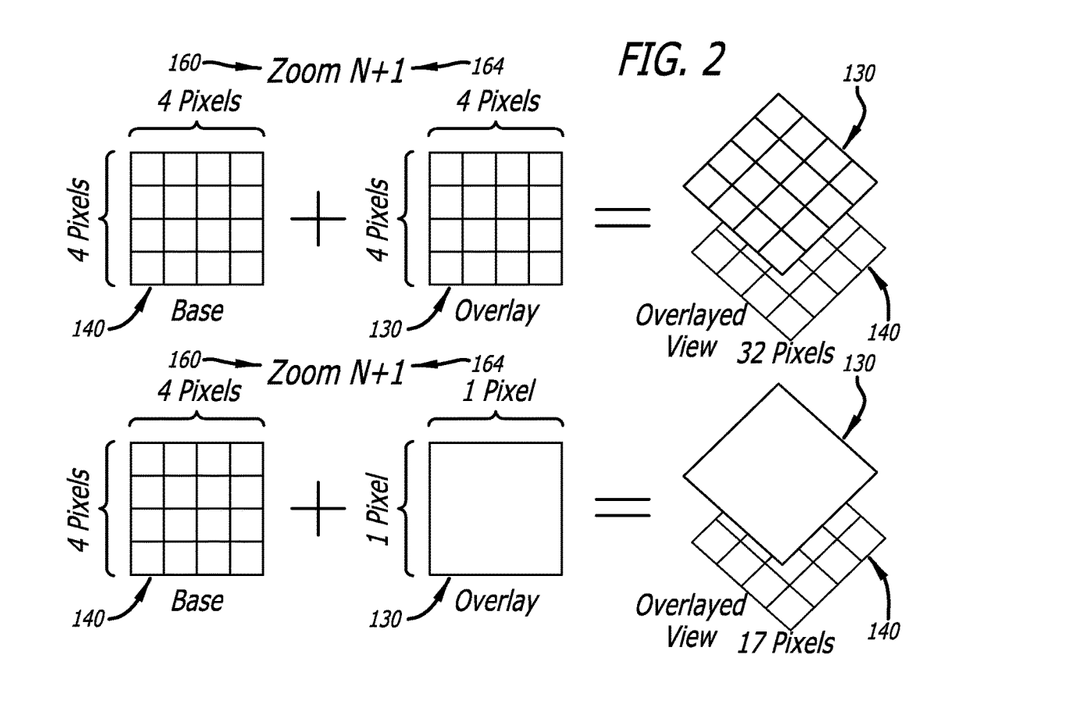
FIG. 2 is a conceptual diagram showing a base layer and an overlay at a zoom level n+1 of a data visualization technique according to the present invention.

FIG. 2 is a conceptual diagram of the data visualization technique 100. FIG. 2 shows both a prior art implementation, as well as an overlay of raster imagery 130 and a base layer 140. In the present invention, when the user-selected zoom level 160 is changed to a level different from the original zoom level n 162, for example n+1 164, the data visualization technique 100 uses the same base layer 140 and overlay 130 as it does for zoom level n 162. Instead of downloading new tiles 150 at the selected zoom level n+1 164, the present invention manipulates the previously-downloaded tiles 150 forming the overlay 130, so that a pixel size at for example 1×1 is displayed on animated map 110 above the base layer 140. This is performed by constructing a tile 150 for the overlay 130 by slicing and downsampling a portion of the raster image from a total image file containing the overlay 130. The data visualization technique 100 therefore loads a larger image computed from a smaller image, and the downloaded tile 150 represents a coarser version of the raster image in the total image file than that requested by a user manipulating the animated map 110.

FIG. 2 also shows a prior art implementation, where the base layer 140 is comprised of a tiled view of a map 110 comprised of, for example, 4×4 pixels. At the user-selected zoom level n+1,164, a tile 150 of data 120 is downloaded for the overlay 130 at the same pixel size of 4×4. Therefore, in such a prior art implementation, the overlay 130 showing data 120 is 16+16=32 square pixels. Like the prior art implementation shown in FIG. 1, this results in long data transfer times, since an animated raster overlay is many times larger than a static raster overlay, and has to be reloaded every time the user changes the zoom level.

In effect, and as noted throughout, the data visualization technique 100 of the present invention "stretches" the overlay 130 so that it has the same effect as if a more defined zoom level 160 were selected, rather than downloading new tiles 150. Where the user-selected zoom level 160 is for a coarser view than for example zoom level n, the present invention "squishes" the overlay 130 so that it has the same effect as if a less defined zoom level 160 were selected, rather than downloading new tiles 150.

Figure 3A:
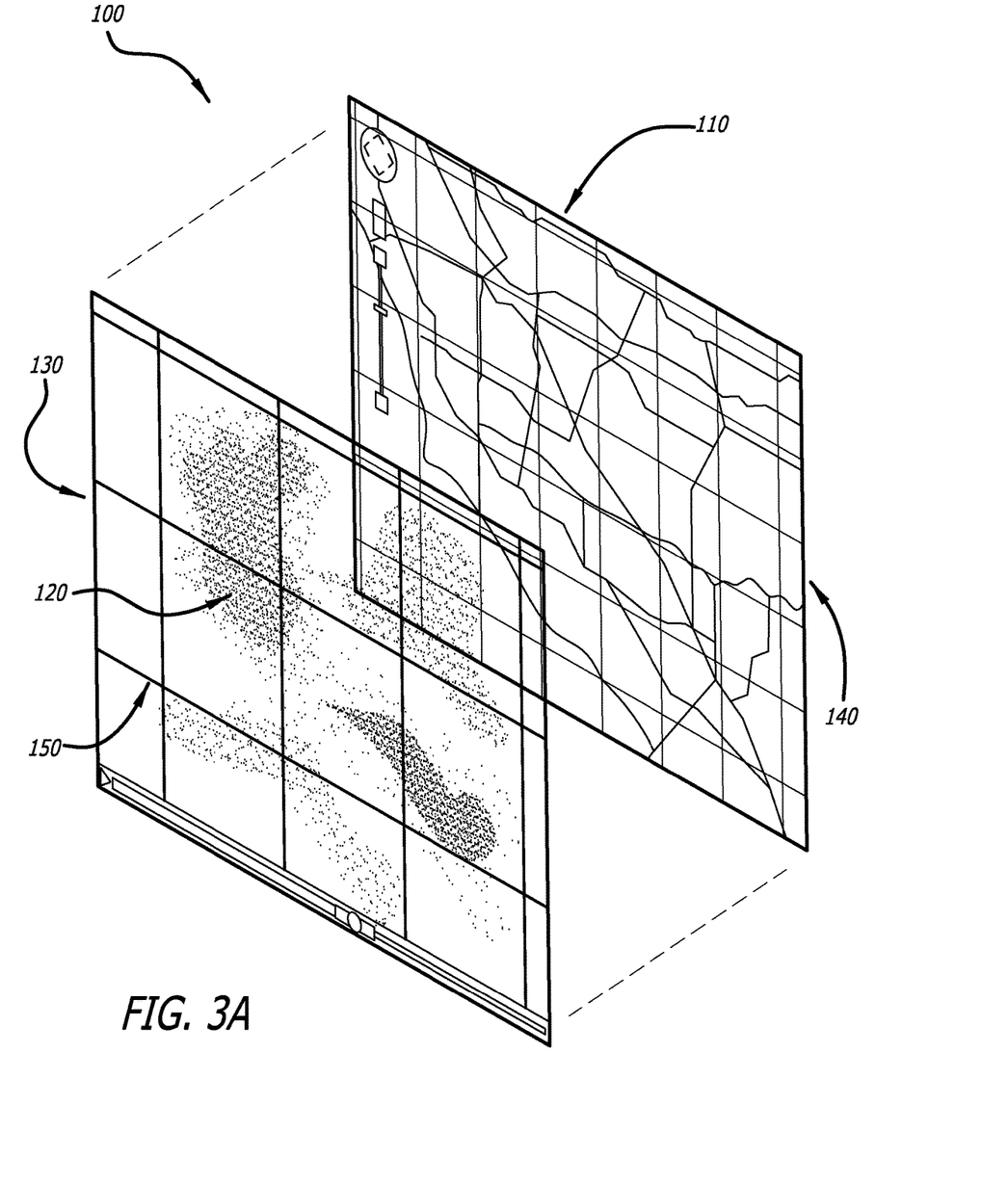
FIG. 3A is an exploded view of an animated map showing an implementation of the data visualization technique according to the present invention.
Figure 3B:
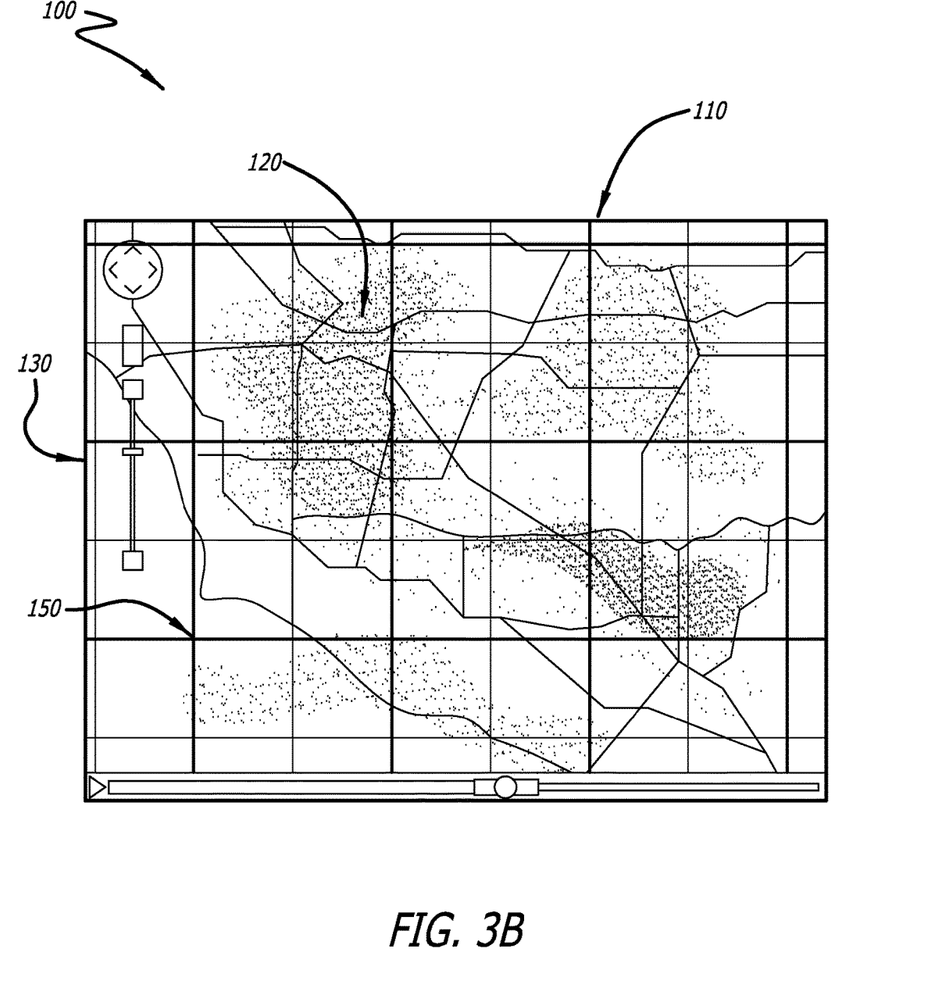
FIG. 3B is another view of an animated map showing an implementation of the data visualization technique according to the present invention.

FIG. 3A and FIG. 3B are screenshot realizations of the data visualization technique 100 according to one embodiment of the present invention, where meteorological data 120 that changes over time is displayed as an overlay 130 on a base layer 140 of an animated map 110. FIG. 3A is an exploded view of a rasterize overlay 130, while FIG. 3B shows the overlay 3B on top of a base layer 140. The data 120 shown is provided as part of MxWx, which is a product that displays both static and animated representations of observed, extrapolated, and forecasted meteorological or weather data. MxWx provides customizable maps of weather data, and may be configured to display such data in a variety ways, such as for example per route or other geographic location. MxWx is capable of displaying historical weather data, loops of current or real-time weather data, and forecasted weather data. Regardless of whether data is displayed as part of the MxWx product, it is contemplated that the present invention is applicable to weather data from different sources, such as radar and satellite, and that many different types of meteorological data may be displayed, such as for example air temperature, wind speed, cloud cover, precipitation, and barometric pressure for a particular geographic area. In a further embodiment, such weather data may displayed as the raster imagery overlaid on top of a base layer comprised of vectorized traffic data, where weather and traffic data are combined in the same display product.

The present invention builds rasterized overlays 130 by starting with a weather model that creates a single, large image raster graphics file format, such as Portable Network Graphics (PNG). The PNG image covers a particular geographic area, such as for example the continental United States. Each pixel in the United States represents exactly one cell in the weather model's simulation, usually 10 km by 10 km. These large PNGs are stored on web servers, and when a user wants a tile 150 for a slippymap overlay 130 on an animated map 110, the data visualization technique 100 of the present invention of the present invention downsamples the source image to match the map scale the client requires (e.g. a pixel covering a 30 km by 30 km instead of the 10 km by 10 km of the source image) and slices out the part of the PNG needed and loads it on the client system. The data visualization technique 100 then stretches it or squishes it so that a pixel size is the size of the user-selected zoom level 160, rather than 10 km by 10 km.

In this manner, when the image is first loaded, it is intentionally loaded as a wrong, or incorrect, zoom level than the user-selected zoom level 160. This initial zoom level is coarser than that selected at a lower resolution than requested, and the image is then stretched on the local client itself. The tiles 150 of the overlay 130 that are loaded are therefore much smaller than requested by the user and are for a zoom level 160 much further out than what the user is actually viewing, so that it covers a lot of tiles 150. In doing so, the present invention equates to rounding data points to a coarser precision than what the client's display is capable of.

Using the above methodology, the present invention therefore does not need to load a new image every time a user requests a different zoom level 160. Instead, the present invention loads a slice of an overlay 130 in the form of a smaller tile 150, and manipulates the smaller tile 150 rather than the larger image. Because the tile shown represents weather data 120 that changes over time in a rasterized layer, rather than a vectorized layer, it will not have an overly distorted appearance to the user. This substantially improves data processing and transfer time without comprising visual appeal of the weather display product to the user. In effect, the same tiled data is presented every time, and stretched or squished as needed, rather than loading a new, large image each time.

The method of the present invention also includes, as part of the calculations performed to arrive at an appropriate size of an image to initially display, a decision-making step that determines whether to display image data at a native resolution or the lower, coarser resolution. It should be noted, therefore, that for any particular zoom level 160, the present invention may include the option of displaying native resolution data, so that when images are loaded on an animated map 110, some image data 120 is loaded at a lower resolution, while other image data 120 is loaded at the resolution actually requested. In this manner, instances of poor image quality, and compromised user experience, are minimized. In this embodiment, the data visualization technique 100 determines when and how often to load data 120 at its native resolution by evaluating several factors, such as for example the level of granularity selected and the size of image data to be loaded.

Similarly, the systems and methods of the present invention implementing the data visualization technique 100 also determine a "distance" between the native data resolution of the image to be displayed and current display resolution. Using such a determination, the data visualization technique 100 may choose to use previously-calculated "stretched" data at a particular zoom level 160 that has already been viewed. For example, an animated map 110 defines an array of available zoom levels 160, such as levels 0-19, with 0 being the coarsest level with the broadest view. The user will start at a particular zoom level 162, for example level 5. Under the present invention, the user will see data 120 from a coarser zoom level, such as level 3. When the user changes the zoom level from 5 to 6, the present invention may further increase processing speed by choosing to continue displaying data 120 loaded at the resolution for zoom level 3, but stretched across a bigger viewing area, and thereby effectively skipping a new load of image data 120. When the user zooms in again to level 7, the data visualization technique 100 then loads a finer zoom level, such as level 5. (Note that in one implementation the present invention may elect to load the native resolution at level 7 or any level between 3 and 7 for a quicker response with less precision.) When the loaded resolution matches the resolution of the weather model (for example 10 km per pixel), zooming in farther need not load finer resolutions since there is no more precision to be gained. In this manner, the data visualization technique 100 of the present invention includes the ability to selectively load particular resolutions, to utilize resources more efficiently and maximize the responsiveness of the display.

It should be understood, therefore, that the present invention is configured to load higher resolution data at some point in the process of displaying raster imagery overlays 130 on an animated map 110, because the user will eventually require data of greater granularity. However, because the user is permitted to zoom in beyond the limit of native data granularity, most (or possibly all) zoom levels are stretched according to the principles disclosed herein.

In the present invention, weather data 120 is displayed as a gradient, where values change as one moves across an image. One element of the data visualization technique 100 is that the client-side system component performs the necessary calculations to load a larger image computed from a smaller image, where the client's browser or application is instructed as to the width and height parameters of the image for application. For example, the browser is instructed to stretch an image to larger sizes of, for example, 512×512, 1024×1024, and 2048×2048, but the image received is only 256×256. The image processing calculations to arrive at the larger image from the smaller, received image is performed entirely by the browser at the local client.

The data visualization technique 100 of the present invention is therefore a computer-implemented method of processing image data 120 that both reduces the size of files loaded from a remote server to a local client for rendering the image in the local client's browser or application and decreases the time needed to load the image. In this method, input data is represented by the data file containing the image, such as in a PNG file, in a coarser version than needed by the browser for visualization. Processing of the input data occurs at the local client, where instead of loading a fresh image file each time a user requests a new zoom level for the image at the size needed, the local client recalls a coarser version of the image of a smaller size, and computes an image of a larger size so as to stretch the image to match the zoom level requested. This is performed by a rough interpolation of the data points of the smaller image by using any available generic image resizing algorithm to generate the larger version of the image.

The present invention may therefore be, in one embodiment, a method of enabling interpolation of data points for visualizing raster imagery in any web browsing environment. The data visualization technique 100 realizes speed and cost efficiencies by performing data processing at the client browser or application, using any generic image resizing algorithm available, such as the built-in image-resizing capability of a web browser. Since color information in the loaded image data includes enough of the original source's meaning, data visualization according to the present invention can be performed by any available image resizing algorithm so that image data does not need to be translated by the client. The browser's built-in capability therefore utilizes the color data to manipulate the image as selected by the user, without having to interpolate the raw image data.

The scaling factor used to present animated raster imagery in a display of data 120 in the data visualization technique 100 may be tuned, so that in one embodiment of the present invention, both a fixed scaling factor and a scaling factor that varies is implemented. For example, a 2:1 scaling factor that is constant at all zoom levels may be applied, in addition to a 2:1-8:1 variable scaling factor, such that the present invention only needs to add entirely new data for display at every fourth zoom level change. Such an implementation enables the present invention to transfer tiles to the client application or browser at a zoom level change according to a preset frequency. The present invention may also implement a limit, where new data stops loading once the maximum underlying data granularity is reached. Regardless, it is to be understood that other variable scaling factors used, and the present invention is not intended to be limited to any one scaling factor, either alone or in combination with a constant scaling factor.

It is further contemplated that the limit of data granularity may be the limit of the data resolution itself. Data 120 in the present invention is generated to a particular resolution, for example to 1 k, 2 k, or 10 k grid squares. Because this represents the limit of data resolution, there is no representation of a grid square by more than one (or perhaps a few) pixel(s). When the present invention reaches a point where data squares are represented by at least one pixel each, the data is scaled on the client application or browser only instead of transferring any additional data.

The data visualization technique 100 may also implement a higher scale factor for immediate display, and load more resolute data after the initial highly-scaled data is loaded. In this embodiment, the present invention loads data at, for example, an 8:1 ratio as soon as a layer is enabled for display, and when the 8:1 data is loaded, 2:1 data could be loaded. In this way, an acceptable 2:1 layer may be displayed, and the present invention then begins displaying in approximately ⅛ the normally-implemented load time, and have an overall data consumption of ½+⅛=⅝ of the normally-implemented bandwidth.

It should be noted that although the present invention is generally described in terms of the implementation of a slippymap animation in a web browser according to a preferred embodiment, the concepts disclosed herein may be applied to any animated map implementation in which data 120 is to be displayed over time. The data visualization technique 100 has application to presentation of many different types of data 120 with animation effects, and it is therefore to be understood that it is not to be limited to weather data displayed either by itself, or as an overlay on a slippymap on top of vectorized traffic data. Accordingly, many other implementations of the present invention are contemplated within the scope of the present invention.

Additional examples of such implementations include data from satellite imagery that may be visualized as a time series animation, such as for example satellite images of changes in ocean temperatures and ocean currents, whether by themselves or overlaid in top of, for example, a topographic base layer. These implementations have commercial applicability in industries such as shipping, fishing, and environmental research such as geological modeling, global warming studies and animal migrations patterns.

Other implementations include visualizing election results as they are reported from voting regions, where the changing election results can be displayed over a map of the reporting area. Additional implementations include "heat map" visualizations of changing population density, business activity, economic data, and specific attributes of traffic data for which data degradation from loading a coarser version of the image selected does not degrade the visual effects of the data visualization to a point where it becomes unappealing to the user. Still further implementations may include visualizations of land usage data, such as zoning maps.

Indeed, it is contemplated that the present invention is applicable to any time-series visualization of data in a raster layer, as long as the user is willing to accept a level of degradation in the image viewed to realize faster data processing times and lower bandwidth consumption. Any popular survey of data that changes over time may realize significant cost and time savings with the concepts disclosed herein. As noted above, there are many commercial applications of animated maps incorporating the concepts disclosed in the present invention.

The systems and methods of the present invention may be implemented in many different computing environments. For example, they may be implemented in conjunction with a special purpose computer, a programmed microprocessor or microcontroller and peripheral integrated circuit element(s), an ASIC or other integrated circuit, a digital signal processor, electronic or logic circuitry such as discrete element circuit, a programmable logic device or gate array such as a PLD, PLA, FPGA, PAL, and any comparable means. In general, any means of implementing the methodology illustrated herein can be used to implement the various aspects of the present invention. Exemplary hardware that can be used for the present invention includes computers, handheld devices, telephones (e.g., cellular, Internet enabled, digital, analog, hybrids, and others), and other such hardware. Some of these devices include processors (e.g., a single or multiple microprocessors), memory, nonvolatile storage, input devices, and output devices. Furthermore, alternative software implementations including, but not limited to, distributed processing, parallel processing, or virtual machine processing can also be configured to perform the methods described herein.

The systems and methods of the present invention may also be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Additionally, the data processing functions disclosed herein may be performed by one or more program instructions stored in or executed by such memory, and further may be performed by one or more modules configured to carry out those program instructions. Modules are intended to refer to any known or later developed hardware, software, firmware, artificial intelligence, fuzzy logic, expert system or combination of hardware and software that is capable of performing the data processing functionality described herein.

The foregoing descriptions of embodiments of the present invention have been presented for the purposes of illustration and description. It is not intended to be exhaustive or to limit the invention to the precise forms disclosed. Accordingly, many alterations, modifications and variations are possible in light of the above teachings, may be made by those having ordinary skill in the art without departing from the spirit and scope of the invention. It is therefore intended that the scope of the invention be limited not by this detailed description. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

The invention claimed is:

1. A method of rapidly loading animated raster data, comprising:
    initiating, in a computing environment comprised of hardware and software components that include at least one processor configured to display animated maps that interactively permit pan and zoom functions on a user interface, an overlay developed from a raster image representative of data that changes over a specific period of time, in response to a user request to view time-series data at a selected zoom level from a client application, wherein the overlay displays representations of observed, extrapolated, and forecasted meteorological data;
    determining a size difference between a native resolution and a coarser resolution for the overlay, so that particular resolutions of the overlay at selected zoom levels are selectively loaded for display based on 1) a granularity of the selected zoom level, and 2) both a pixel size and an image size of the raster image;
    constructing a tile for presentation of the coarser resolution of the overlay on an animated map by slicing and downsampling a portion of the raster image representative of data from a total image file, the tile representing a coarser version of the raster image representative of data than the selected zoom level from the user request;
    computing a larger version of each tile at the client application to stretch the raster image so that the coarser version of the raster image appears as a larger zoom level than the selected zoom level; and
    performing additional computations on the larger version of each tile to manipulate previously-loaded tiles by rounding a plurality of data points on the larger version of each tile so that when the user requests different zoom levels, a resolution of the previously-loaded tiles appears equal to a resolution of the current zoom level on the animated map so that the previously-loaded tiles are either stretched or squished depending on the selected zoom level, until the user selects a zoom level that is substantially different from the tiles of raster images available at the client application.

2. The method of claim 1, further comprising transferring the tile for presentation of the overlay on an animated map to the client application in response to the user request.

3. The method of claim 1, wherein the meteorological data comprises at least one of air temperature, wind speed, cloud cover, precipitation, and barometric pressure for a particular geographic area.

4. The method of claim 3, wherein representations of observed, extrapolated, and forecasted meteorological data are displayed on a slippymap on top of a base layer at least comprised of a topographical map of a geographic area.

5. The method of claim 4, wherein the based layer also includes vectorized traffic data.

6. The method of claim 1, further comprising interpolating, at the client application, data points comprising the tile representing a coarser version of the raster image representative of data to generate the larger version of each tile.

7. The method of claim 1, further comprising utilizing color data in the tile representing a coarser version of the raster image representative of data to manipulate the raster image according to the user-selected zoom level without having to interpolate data comprising the raster image.

8. The method of claim 1, further comprising tuning a presentation of the overlay using a fixed scaling factor remaining constant at all zoom levels and a variable scaling factor so that a new tile is transferred to the client application at a zoom level change according to a preset frequency.

9. The method of claim 1, further comprising tuning a presentation of the overlay using a higher scale factor for immediate display of the raster image, and loading more resolute data after the initial highly-scaled data in the raster image is loaded.

10. A method of presenting a time-series visualization of data on a display, comprising:
    loading, from a remote server and within a computing environment comprised of hardware and software components that include at least one processor configured to display animated maps that interactively permit pan and zoom functions on a user interface, a tiled portion of a total image file forming an overlay developed from a large raster image representative of time-series data, in response to a user request to view time-series data on an animated map of one or more additional layers including at least one of a base layer, a vector layer, and an additional raster layer, at a selected zoom level from a client application, wherein the overlay developed from large raster image representative of time-series data displays observed, extrapolated, and forecasted meteorological data;

determining a size difference between a native resolution and a coarser resolution for the overlay, so that particular resolutions of the overlay at selected zoom levels are selectively loaded for display based on 1) a granularity of the selected zoom level, and 2) both a pixel size and an image size of the raster image;

processing, at the client application, the tiled portion from the total image file by calculating approximate data points of a larger version of the tiled portion to re-size the tiled portion so that a coarser representation of the time-series data is displayed at the client application than the selected zoom level;

displaying an output data file representing the larger version of the tiled portion from the total image file for visualization of the overlay at the coarser resolution of the at the client application; and performing additional computations on the larger version of the tiled portion to manipulate previously-loaded tiled portions by rounding a plurality of data points on the larger version of each tiled portion so that when the user requests different zoom levels, a resolution of the previously-loaded tiled portions appears equal to a resolution of the current zoom level on the animated map so that the previously-loaded tiled portions are either stretched or squished depending on the selected zoom level, until the user selects a zoom level that is substantially different from the tiles of raster images available at the client application.

11. The method of claim 10, wherein the meteorological data comprises at least one of air temperature, wind speed, cloud cover, precipitation, and barometric pressure for a particular geographic area.

12. The method of claim 11, wherein representations of observed, extrapolated, and forecasted meteorological data are displayed on a slippymap on top of a base layer at least comprised of a topographical map of a geographic area.

13. The method of claim 12, wherein the base layer also includes vectorized traffic data.

14. The method of claim 10, further comprising utilizing color data in the tiled portion of a total image file forming an overlay developed from large raster image representative of time-series data to manipulate the raster image according to the user-selected zoom level without having to interpolate data comprising the raster image.

15. The method of claim 10, further comprising tuning a presentation of the overlay using a fixed scaling factor remaining constant at all zoom levels and a variable scaling factor so that a new tiled portion is transferred to the client application at a zoom level change according to a preset frequency.

16. The method of claim 10, further comprising tuning a presentation of the overlay using a higher scale factor for immediate display of the raster image, and loading more resolute data after the initial highly-scaled data in the raster image is loaded.

17. An animated weather display system, comprising:
an animated mapping function configured to generate an animated map that interactively permits pan and zoom functions on a user interface, the animated map composed of one or more base layers and one or more raster layers as an animated overlay, the animated overlay representing data displayed as a series of changing events over time correlated with a particular geographic area, wherein the overlay displays representations of observed, extrapolated, and forecasted meteorological data;

a local client application on which the overlay and the one or more base layers of the animated map are displayed, the data displayed as a series of changing events over time correlated with a particular geographic area stored a remote server communicatively coupled to the local client application; and a plurality of data processing modules, executed by at least one processor from the local client application within a computing environment comprised of hardware and software components configured to carry out the animated mapping function, the plurality of data processing modules configured to:

determine a size difference between a native resolution and a coarser resolution for the animated overlay, so that particular resolutions of the animated overlay at selected zoom levels are selectively loaded for display based on 1) a granularity of the selected zoom level, and 2) both a pixel size and an image size of a raster image, construct a tile for presentation of the coarser resolution of the animated overlay on the animated map by slicing and downsampling a portion of a the raster image representative of data from a total image file, the tile representing a coarser version of the raster image representative of data than the selected zoom level from the a user request, compute a larger version of each tile at the local client application to stretch the raster image so that the coarser version of the raster image appears as a larger zoom level than the selected zoom level, and perform additional computations on the larger version of each tile to manipulate previously-loaded tiles by rounding a plurality of data points on the larger version of each tile so that when the user requests different zoom levels, a resolution of the previously-loaded tiles appears equal to a resolution of the current zoom level on the animated map so that the previously-loaded tiles are either stretched or squished depending on the selected zoom level, until the user selects a zoom level that is substantially different from the tiles of raster images available at the local client application.

18. The system of claim 17, wherein the meteorological data comprises at least one of air temperature, wind speed, cloud cover, precipitation, and barometric pressure for a particular geographic area.

19. The system of claim 18, wherein representations of observed, extrapolated, and forecasted meteorological data are displayed on a slippymap on top of the base layer at least comprised of a topographical map of a geographic area.

20. The system of claim 19, wherein the based layer also includes vectorized traffic data.

21. The system of claim 17, wherein the plurality of data processing modules are further configured to interpolate, at the client application, data points comprising the tile representing a coarser version of the raster image representative of data to generate the larger version of each tile.

22. The system of claim 17, wherein the plurality of data processing modules are further configured to utilize color data in the tile representing a coarser version of the raster image representative of data to manipulate the raster image according to the user-selected zoom level without having to interpolate data comprising the raster image.

23. The system of claim 17, wherein the plurality of data processing modules are further configured to tune a presentation of the overlay using a fixed scaling factor remaining constant at all zoom levels and a variable scaling factor so that a new tile is transferred to the client application at a zoom level change according to a preset frequency.

24. The system of claim 17, wherein the plurality of data processing modules are further configured to tune a presentation of the overlay using a higher scale factor for immediate display of the raster image, and loading more resolute data after the initial highly-scaled data in the raster image is loaded.

* * * * *